US 9,600,855 B2

(12) United States Patent
Tan

(10) Patent No.: US 9,600,855 B2
(45) Date of Patent: Mar. 21, 2017

(54) VIEW PROJECTION

(75) Inventor: Kar-Han Tan, Santa Clara, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 2383 days.

(21) Appl. No.: 12/501,416

(22) Filed: Jul. 11, 2009

(65) Prior Publication Data
US 2011/0010411 A1  Jan. 13, 2011

(51) Int. Cl.
G06F 17/14 (2006.01)
G06F 7/38 (2006.01)
G06F 7/32 (2006.01)
H04N 5/64 (2006.01)
H04N 3/22 (2006.01)
G06T 3/00 (2006.01)
H04N 9/31 (2006.01)

(52) U.S. Cl.
CPC .......... G06T 3/00 (2013.01); H04N 9/3182 (2013.01); H04N 9/3185 (2013.01); H04N 9/3194 (2013.01)

(58) Field of Classification Search
CPC .. G06T 3/00; G06F 7/00; G06F 17/00; H04N 9/00
USPC ........ 708/400, 442, 520, 402, 514; 348/745, 348/744
See application file for complete search history.

(56) References Cited

U.S. PATENT DOCUMENTS

| 5,528,528 | A * | 6/1996 | Bui ............................. 708/400 |
| 5,883,823 | A * | 3/1999 | Ding ............................ 708/402 |
| 7,412,159 | B2 * | 8/2008 | Ichimiya ...................... 396/104 |
| 8,201,951 | B2 * | 6/2012 | Ding et al. .................... 353/121 |
| 2001/0003456 | A1 * | 6/2001 | Kagawa et al. .............. 345/418 |
| 2002/0097256 | A1 * | 7/2002 | Miller et al. ................. 345/723 |
| 2006/0243918 | A1 * | 11/2006 | Aloni et al. ............... 250/492.2 |
| 2007/0171381 | A1 | 7/2007 | Tan |
| 2007/0171382 | A1 * | 7/2007 | Tan et al. ........................ 353/69 |
| 2008/0174704 | A1 | 7/2008 | Tan |
| 2009/0073324 | A1 * | 3/2009 | Tan et al. ...................... 348/745 |
| 2009/0196393 | A1 * | 8/2009 | Wang et al. ...................... 378/4 |
| 2010/0023336 | A1 * | 1/2010 | Shmunk ........................ 704/503 |

OTHER PUBLICATIONS

Wetzstein, G., Bimber, O.: Radiometric compensation through inverse light transport. In: PG '07: Proceedings of the 15th Pacific Conference on Computer Graphics and Applications, Washington, DC, USA, IEEE Computer Sodety (2007) 391-399.

(Continued)

Primary Examiner — Farley Abad
Assistant Examiner — Henry Yu
(74) Attorney, Agent, or Firm — Law Office of Edouard Garcia

(57) ABSTRACT

A first derived matrix of transport coefficients and a second derived matrix of transport coefficients are derived from a primary matrix of transport coefficients. Each of the transport coefficients describes transport of a respective image forming element from a first position onto one or more image forming elements at a second position. An approximate inverse of the first derived matrix is ascertained. A modified version of a projection image is determined from the projection image, the approximated inverse of the first derived matrix, and the second derived matrix. The modified version of the projection image is rendered from the first position onto a physical medium at the second position.

20 Claims, 5 Drawing Sheets

(56) References Cited

OTHER PUBLICATIONS

Sen, P., Chen. B., Garg G., Marschner, S.R., Horowitz, M., Levoy, M., Lensch, H.P.A.: Dual Photography. In: Proceedings ACM SIGGRAPH. (2005).

Seitz, S.M., Matsushita, Y., Kutulakos, K.N.: A theory of inverse light transport. In Proceedings IEEE International Conference on Computer Vision (ICCV) (2005).

* cited by examiner

VIEW PROJECTION

BACKGROUND OF THE INVENTION

The increasing affordability and capabilities of video projectors, have led to the proliferation of view projection applications in a wide variety of different application environments, including home entertainment and visualization. An emerging class of view projection devices combines a projector and a camera into a hybrid system that can project images onto different projection surfaces with minimal distortions. This capability depends in large part on the ability to compensate for shape irregularities in the projection surfaces so as to reduce artifacts (e.g., geometrical distortions, defocus or color and intensity blending) in the projected images. In some approaches, the compensation process involves calibrating intrinsic and extrinsic parameters of the projection-camera system, followed by the computationally intensive processes of identifying and compensating for projection distortion. Other approaches synthesize images captured by the camera into pseudo (or "dual") images representing the viewpoint of the projector. The enormous size of the light transport matrix, however, poses a significant hurdle in the successful implementation of such approaches. What are needed are improved view projection systems and methods.

BRIEF SUMMARY OF THE INVENTION

In one aspect, the invention features a method in accordance with which a first derived matrix of transport coefficients and a second derived matrix of transport coefficients are derived from a primary matrix of transport coefficients. Each of the transport coefficients describes transport of a respective image forming element from a first position onto one or more image forming elements at a second position. An approximate inverse of the first derived matrix is ascertained. A modified version of a projection image is determined from the projection image, the approximated inverse of the first derived matrix, and the second derived matrix. The modified version of the projection image is rendered from the first position onto a physical medium at the second position.

The invention also features apparatus operable to implement the inventive methods described above and computer-readable media storing computer-readable instructions causing a computer to implement the inventive methods described above.

Other features and advantages of the invention will become apparent from the following description, including the drawings and the claims.

DETAILED DESCRIPTION OF THE INVENTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. DEFINITION OF TERMS

The term "image forming element" refers to an addressable region of an image. In some embodiments, the image forming elements correspond to pixels, which are the smallest addressable units of an image. Each image forming element has at least one respective value that is represented by one or more bits. For example, an image forming element in the RGB color space includes a respective value for each of the colors red, green, and blue, where each of the values may be represented by one or more bits.

A "computer" is a physical machine that processes data according to machine-readable instructions (e.g., software) that are stored on a machine-readable medium either temporarily or permanently. A set of such instructions that performs a particular task is referred to as a program or software program.

The term "machine-readable medium" refers to any physical medium capable carrying information that is readable by a machine (e.g., a computer). Storage devices suitable for tangibly embodying these instructions and data include, but are not limited to, all forms of non-volatile computer-readable memory, including, for example, semiconductor memory devices, such as EPROM, EEPROM, and Flash memory devices, magnetic disks such as internal hard disks and removable hard disks, magneto-optical disks, DVD-ROM/RAM, and CD-ROM/RAM.

As used herein, the term "includes" means includes but not limited to, the term "including" means including but not limited to. The term "based on" means based at least in part on. The term "view" means the viewpoint from which an image is projected or onto which an image is rendered.

II. INTRODUCTION

The embodiments that are described herein provide improved view projection systems and methods that are capable of compensating for shape irregularities in the projection surfaces so as to reduce artifacts (e.g., geometrical distortions, defocus or color and intensity blending) in the projected images. In these embodiments, the compensation is achieved based on an improved approximation of the dual transport matrix that enables complex scattering effects to be compensated while still achieving realtime performance.

III. GENERALIZED VIEW PROJECTION

Figures 1, 2:
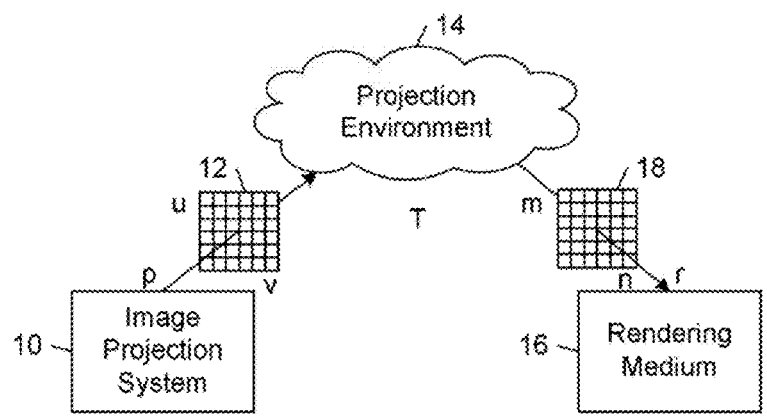
FIG. 1 is a block diagram of an embodiment of an image projection system projecting an image from a first position, through a projection environment, and onto a rendering medium at a second position.
FIG. 2 shows an embodiment of an equation that includes a matrix of transport coefficients that relates a projection image to a rendered image.

FIG. 1 shows an embodiment of an image projection system 10 projecting a projection image 12 from a first position, through a projection environment 14, and onto a rendering medium 16 at a second position. The projection image 12 typically is projected from a projection plane in the image projection system 10.

The projection image 12 is composed of image forming elements, which may be any type of visual phenomenon that can be combined to form an image, including patterns of light and patterns of ink droplets. The projection image has a resolution of u×v image forming elements, where u is the number of rows of image forming elements in the projection image 12 and v is the number of columns of image forming elements in the projection image 12.

The rendering medium 16 may be any type of physical medium on which an image 18 may be rendered, in general, the rendered image 18 has a resolution of m×n image forming elements, where m is the number of rows of image forming elements in the rendered image 18 and n is the number of columns of image forming elements in the rendered image 18. The resolutions of the projection image 12 and the rendered image 18 may be the same or different. In embodiments in which the rendering medium 16 is an active area of an image sensor (e.g., a two-dimensional CCD or CMOS image sensor), the resolutions of the projection image 12 and the rendered image 18 typically are different.

The projection environment 14 may be any type of environment through which the projection image 12 may be transported to the rendering medium 16. In some embodiments, the projection environment 14 corresponds to an unobstructed path between the image projection system 10 and the rendering medium 16. In other embodiments, the projection environment 14 provides one or more reflective or deflective surfaces that reflect or deflect at least a portion of the projection image 12 onto the rendering medium 16. Characteristics of the transport path (e.g., irregularities of any deflective surfaces) through the projection environment 14 influence the integrity of the rendered image 18.

Referring to FIGS. 1 and 2, the transport of the projection image 12 from the Image projection system 10, through the projection environment 14, and onto the rendering medium 16 in the form of the rendered image 18 may be modeled by the following linear equation:

$$r = T \cdot p \tag{1}$$

where p is a column vector that represents the projection image 12, r is a column vector that represents the rendered image 18, and T is a matrix of mn×uv transport coefficients that describe transport of image forming elements from the first position onto respective ones of the image forming elements at the second position. In some embodiments, each of the columns of T represent an image $r_k$ that would be rendered onto the rendering medium 16 by a respective one of the image forming elements of the projection image 12. Thus, T is a concatenation of column vectors representing the set of rendered images $r_k$ for k=1, . . . , uv.

There are a variety of different ways for determining the transport matrix T. For example, in some embodiments, the transport coefficients of T are acquired by projecting uv different patterns from the image projection system 14, where each pattern consists of a different respective one of the image forming elements activated (e.g., lit in the case of light projection or containing an ink droplet in the case of ink projection). Other embodiments, may use more efficient techniques for acquiring the transport coefficients of T, including the fixed pattern scanning technique and the adaptive multiplexed illumination technique that are described in Sen, P, et al., "Dual photography" Proceedings ACM SIGGRAPH (2005), as well as the parallel pixel scanning technique described in U.S. Patent Publication No. 2008/0174704.

Figure 3:
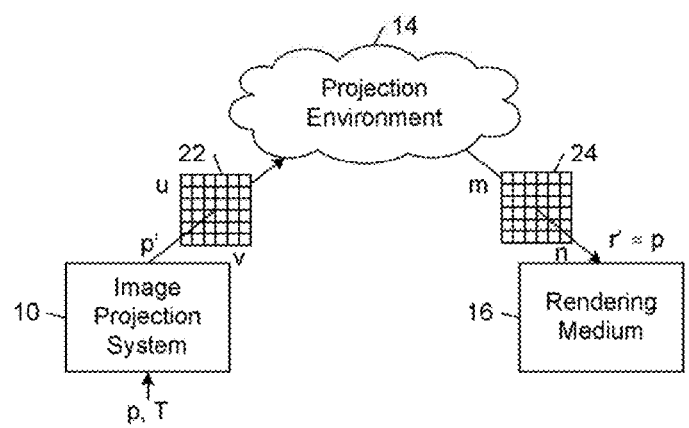
FIG. 3 is a block diagram of the image projection system of FIG. 1 projecting a modified version of a projection image from the first position, through the projection environment, and onto the rendering medium at the second position.

Referring to FIG. 3, after the transport matrix T has been acquired, the image projection system 10 uses the transport matrix T and a desired image p to synthesize a projection image 22 (p') that, when projected through the projection environment 14, results in a rendered image 24 (r') that approximates the desired image p. In this embodiment, the projection image p' compensates for the anticipated distortions and other artifacts that are introduced by the projection environment 14 and the rendering medium 16 in order to produce at the second position and image (r') that appears to be substantially similar to the desired image p (i.e., r'=p). In general, the projection image p' can be synthesized from the inverse desired image p by evaluating the following dual transport equation:

$$p' = T^{-1} \cdot p \tag{2}$$

where $T^{-1}$ is the inverse of the transport matrix T.

As explained above, the size of T is typically is so large that the inverse $T^{-1}$ cannot be computed directly in a practical manner. The image projection system 10 overcomes this difficulty by determining an approximation of the dual transport equation that enables complex scattering effects to be compensated white still achieving realtime performance.

Figure 4:
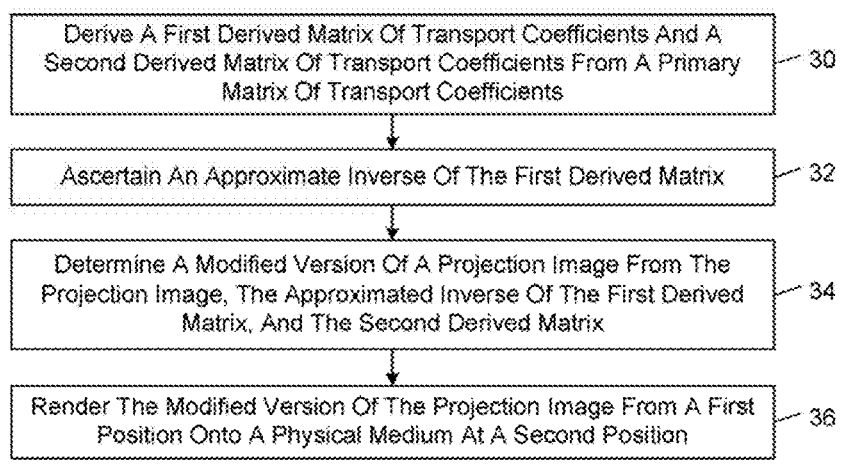
FIG. 4 is a flow diagram of an embodiment of a view projection method.

FIG. 4 shows an embodiment of a method by which the image projection system 10 produces the rendered image r' onto the rendering medium at the second position. In accordance with this method, the image projection system 10 derives a first derived matrix (D1) of transport coefficients and a second derived matrix (D2) of transport coefficients from a primary matrix (T) of transport coefficients (FIG. 4, block 30). As explained above, each of the transport coefficients describes transport of a respective image forming element from a first position onto one or more image forming elements at a second position. The image projection system 10 ascertains an approximate inverse of the first derived matrix (FIG. 4, block 32). The image projection system 10 determines a modified version of a projection image from the projection image, the approximated inverse of the first derived matrix, and the second derived matrix (FIG. 4, block 34). The image projection system 10 renders the modified version of the projection image from the first position onto a physical medium at the second position (FIG. 4, block 36).

The image projection system 10 typically derives the first derived transport matrix (D1) from one or more of the highest valued transport coefficients in each row of the primary transport matrix (T) and derives the second derived transport matrix (D2) from one or more of the lower valued ones of the transport coefficients in each row of the primary transport matrix (T). In this way, the first derived transport matrix (D1) tends to correspond the direct components of the projection image that are directly projected onto the rendering medium 16 and the second derived transport matrix (D2) tends to correspond to the global components of the projection image that are indirectly (e.g., by scattering) projected onto the rendering medium 16.

In some embodiments, the image projection system 10 derives the first and second derived matrices by decomposing the primary matrix (T) into the first derived matrix (D1) and the second derived matrix (D2) such that $$T = D1 + D2. \tag{3}$$

In these embodiments, the primary transport matrix (T) is decomposed into the first and second derived transport matrices (D1, D2) as follows. For each row of T, one or more of the transport coefficients in the row of T that are higher in value than all other ones of the transport coefficients in the row of T are identified. One or more corresponding ones of the transport coefficients in D1 are respectively derived from the one or more identified transport coefficients and all other ones of the transport coefficients in D1 are set equal to zero. Ones of the transport coefficients in D2 that correspond to the identified transport coefficients in T are respectively set equal to zero and all other ones of the transport coefficients in D2 are respectively set equal to the corresponding ones of the transport coefficients in T.

Figure 5:
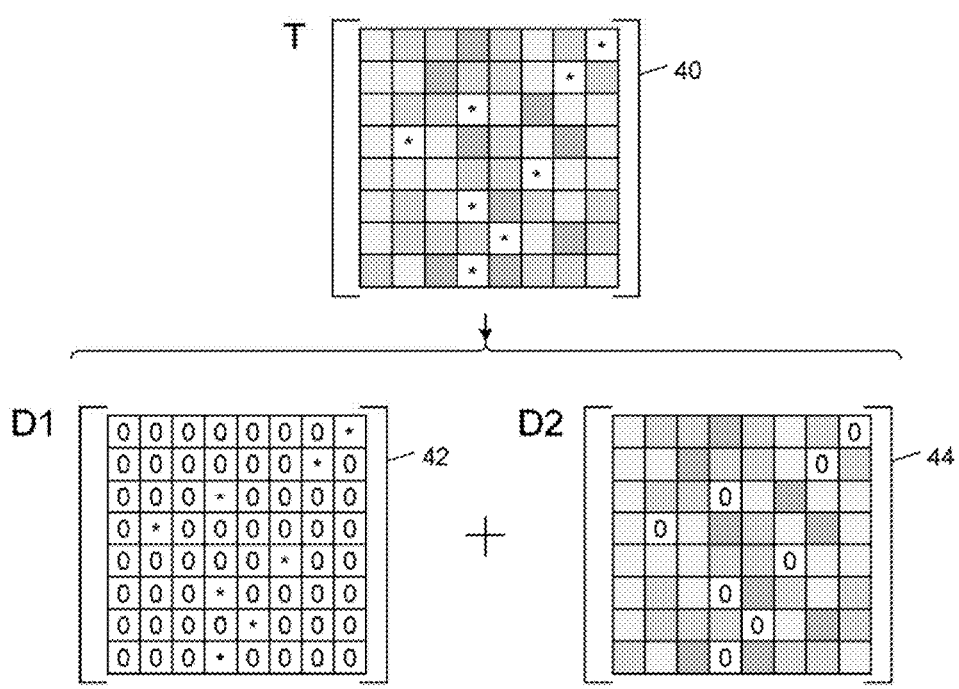
FIG. 5 shows a decomposition of a primary light transport matrix decomposed into a first derived light transport matrix and a second derived light transport matrix in accordance with an embodiment of the method of FIG. 3.

Referring to FIG. 5, in some embodiments, for each row of T, only the highest valued one of transport coefficients in the row of T is identified. In FIG. 5, the primary transport matrix T is represented by the matrix 40 in which the identified highest valued ones of the transport coefficients in each row of T are designated by respective stars (*) in white boxes, and the lower valued ones of the transport coefficients are designated by respective boxes that are filled with different shades of gray. In these embodiments, the transport coefficients of D1 are derived by setting the corresponding transport coefficients in D1 equal to the identified transport coefficients in T and setting equal to zero all other ones of the transport coefficients in D1, as shown by matrix 42 in FIG. 5. The transport coefficients of D2 are derived by setting equal to zero only the transport coefficients in D2 that correspond to the identified transport coefficients in T and setting all other ones of the transport coefficients in D2 respectively equal to the corresponding ones of the transport coefficients in T, as shown by matrix 44 in FIG. 5.

Figure 6A:
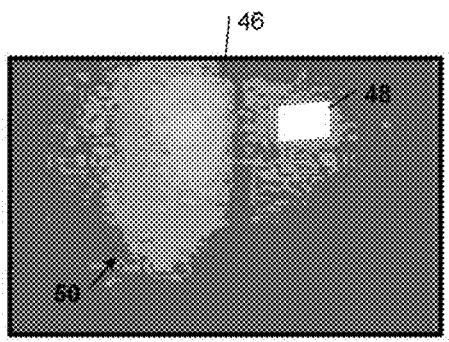
FIG. 6A shows an exemplary image that, was projected into a surface and captured by a camera.
Figure 6B:
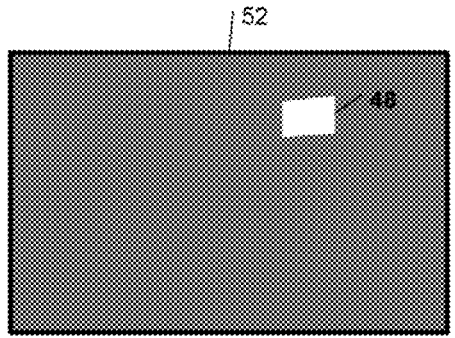
FIGS. 6B and 6C show an exemplary decomposition of the image of FIG. 6A into first and second derived images.
Figure 6C:
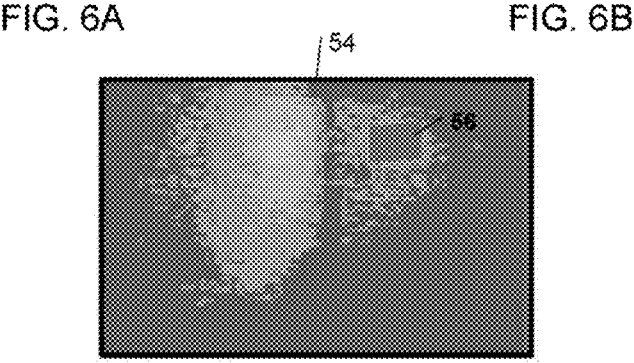

FIG. 6A shows an exemplary image 46 that was produced by directing a rectangular light pattern onto a concave display surface and capturing the image reflected from the display surface with a camera. The image 46 includes a light-colored quadrilateral region 48 that corresponds to the component of the projected rectangular light pattern that was directly reflected from the display surface. The image 46 also includes darker regions 50 that correspond to components of the projected light that was scattered before reaching the camera. FIGS. 6B and 6C show an exemplary decomposition of the image 46 of FIG. 6A into first and second derived images 52 and 54 in which only the quadrilateral region 48 is retained in the first derived image 52 and all but the quadrilateral region 48 (which is set to the zero-valued region 56) are retained in the second derived image 54, as described above in connection with the embodiment of FIG. 5.

In some embodiments, the approximate inverse ($\tilde{D}1^T$) of the first derived transport matrix (D1) is ascertained as follows. Each column ($A_i$) of a matrix A is equal to a normalized version of the corresponding column ($D1_i$) of D1 in accordance with equation (4):

$$A_i = \frac{D1_i}{\|D1_i\|^2} \tag{4}$$

where i has a value that indexes the columns $D1_i$ and $\tilde{A}_i$, $\|D1_i\|$ is a norm of $D1_i$ (e.g., the Euclidean norm), and the approximate inverse ($\tilde{D}1^T$) of D1 is given by a transpose ($A^T$) of the matrix A. That is, $$\tilde{D}1^T = A^T \tag{5}$$

After the approximate inverse ($\tilde{D}1^T$) of D1 has been ascertained, the image projection system 10 determines the modified version (p') of the projection image (p) by solving for p' in equation (6):

$$p' = \tilde{D}1^T \cdot (p - D2 \cdot p') \tag{6}$$

where D2 is the second derived transport matrix. In some embodiments, the modified version (p') of the projection image (p) is determined by iteratively solving a series of approximations ($p'_j$) of the corrected version (p') of the projection image (p) in accordance with equation (7):

$$p'_{j+1} = \tilde{D}1^T \cdot (p - D2 \cdot p'_j) \tag{7}$$

where j has an integer value 0, 1, ..., S−1 that indexes the approximations ($p'_j$) in the series, S is an empirically determined maximum number of iterations, and $p'_0 = \tilde{D}1^T \cdot p$.

IV. EXEMPLARY OPERATING ENVIRONMENTS

A. Introduction

As explained above, the modified version of the desired projection image may be rendered onto the rendering medium 16 in a variety of different ways depending on the target application environment.

In general, the image projection system 10 typically includes one or more discrete data processing components, each of which may be in the form of any one of various commercially available data processing chips. In some implementations, the image projection system 10 is embedded in the hardware of any one of a wide variety of digital and analog electronic devices, including desktop and workstation computers, digital still image cameras, digital video cameras, printers, scanners, and portable electronic devices (e.g., mobile phones, laptop and notebook computers, and personal digital assistants). In some embodiments, the image projection system 10 executes process instructions (e.g., machine-readable code, such as computer software) in the process of implementing the methods that are described herein. These process instructions, as well as the data generated in the course of their execution, are stored in one or more computer-readable media. Storage devices suitable for tangibly embodying these instructions and data include all forms of non-volatile computer-readable memory, including, for example, semiconductor memory devices, such as EPROM, EEPROM, and flash memory devices, magnetic disks such as internal hard disks and removable hard disks, magneto-optical disks, DVD-ROM/RAM, and CD-ROM/RAM.

Embodiments of the image projection system 10 may be implemented by one or more discrete modules (or data processing components) that are not limited to any particular hardware or software configuration, but rather it may be implemented in any computing or processing environment, including in digital electronic circuitry or in computer hardware, firmware, device driver, or software. In some embodiments, the functionalities of the modules are combined into a single data processing component. In some embodiments, the respective functionalities of each of one or more of the modules are performed by a respective set of multiple data processing components. The various modules of the image projection system 10 may be co-located on a single apparatus or they may be distributed across multiple apparatus; if distributed across multiple apparatus, the modules may communicate with each other over local wired or wireless connections, or they may communicate over global network connections (e.g., communications over the internet).

Figure 7:
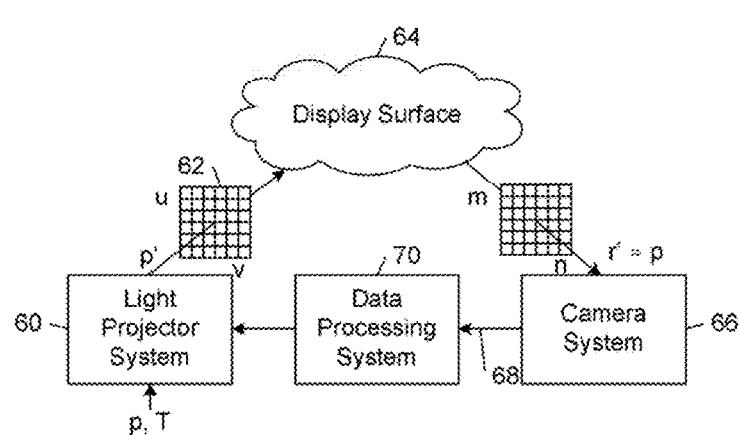
FIG. 7 is a block diagram of an embodiment of the image projection system of FIG. 1.

B. A First Exemplary View Projection System Architecture and Application Environment FIG. 7 shows an embodiment 50 of the image projection system 10 that is implemented by a light projector system that renders the modified version (p') of the desired projection image (p) by projecting a light pattern 62 corresponding to the modified version of the projection image from the first position onto a physical display surface 64 (e.g., a display screen or a wall surface). A camera system 66 positioned at the second position captures light reflecting from the display surface 64 to produce images 68 of the reflected light. The images 68 are passed to a data processing system 70. In some embodiments, the data processing system determines the primary transport matrix (T), the first and second derived transport matrices (D1, D2), the approximate inverse ($\tilde{D}1^T$) of the first derived transport matrix (D1), and the modified version (p') of the desired projection image (p) in accordance with the methods described above.

In some embodiments, the data processing system 70 choreographs the operation of the light projector system 60 end the camera system 66. The images 68 produced by the camera system 68 are passed to the data processing system 14, which produces the modified version (p') of the desired projection image (p) from the received data. In some embodiments, the desired projection image (p) is specified by a user (e.g., a user-specified set of presentation slides or photographs).

The light projector system 60 may be implemented by a wide variety of different types of light sources. Exemplary light sources include strongly colored incandescent light projectors with vertical slit filters, laser beam apparatus with spinning mirrors, LEDs, and computer-controlled light projectors (e.g., LCD-based projectors or DLP-based projectors). In the illustrated embodiments, the light projector system 60 is a computer-controlled light projector that allows the projected light patterns to be dynamically altered using computer software.

In general, the camera system 66 may be any type of imaging device, including a computer-controllable digital camera (e.g., a Kodak DCS760 camera), a USB video camera, and a Firewire/1394 camera. USB video cameras or "webcams," such as the Intel PC Pro, generally capture images thirty fps (frames per second) at 320×240 resolution, while Firewire cameras (e.g., Point Grey Research Dragonfly) can capture at higher frame rates and/or resolutions. The camera system 66 typically remains fixed in place and is oriented toward the display surface 64. The camera system 66 typically includes an image sensor (e.g., a charge coupled device (CCD) or a complementary metal-oxide-semiconductor (CMOS) image sensor), a sensor controller, a memory, a frame buffer, a microprocessor, an ASIC (application-specific integrated circuit), a DSP (digital signal processor), an I/O (input/output) adapter, and a machine-readable storage medium. The storage medium may be implemented by any type of image storage technology, including a compact flash memory card and a digital video tape cassette. The image data stored in the storage medium may be transferred to a storage device (e.g., a hard disk drive, a floppy disk drive, a CD-ROM drive, or a non-volatile data storage device) of an external processing system (e.g., a computer or workstation) via an I/O subsystem.

In some embodiments, the light projector system 60 and the camera system 66 operate In the visible portion of the electromagnetic spectrum. In other embodiments, the light projector system 60 and the camera system 66 operate in other regions (e.g., infrared or ultraviolet regions; color or strictly grayscale) of the electro-magnetic spectrum. As explained in detail above, the actual 3-D location and orientation of the light projector system 60 with respect to the camera system 66 need not be estimated in order to generate the modified version (p') of the desired projection image (p).

The data processing system 70 includes a processing unit, a system memory, and a system bus that couples the processing unit to the various components of the computer. The processing unit may include one or more processors, each of which may be in the form of any one of various commercially available processors. Generally, each processor receives instructions and data from a read-only memory and/or a random access memory. The system memory typically includes a read only memory (ROM) that stores a basic input/output system (BIOS) that contains start-up routines for the computer, and a random access memory (RAM). In some embodiments, the data processing system is implemented by a computer that additionally includes a hard drive, a floppy drive, and CD ROM drive that are connected to the system bus by respective interfaces. The hard drive, floppy drive, and CD ROM drive contain respective computer-readable media disks that provide non-volatile or persistent storage for data, data structures and computer-executable instructions. Other computer-readable storage devices (e.g., magnetic tape drives, flash memory devices, and digital video disks) also may be used with the computer. A user may interact (e.g., enter commands or data) with the computer using a keyboard, a pointing device, or other means of input. Information may be displayed to the user on a monitor or with other display technologies, in some embodiments, the computer also may consist of one or more graphics cards, each of which is capable of driving one or more display outputs that are synchronized to an internal or external clock source.

In some embodiments, the data processing system 70 is implemented as a discrete component that is separate from the light projector system 60 and the camera system 66. In other embodiments, the data processing system 70 is incorporated al least in part in one or both of the light projector system 60 and the camera system 66.

Figure 8:
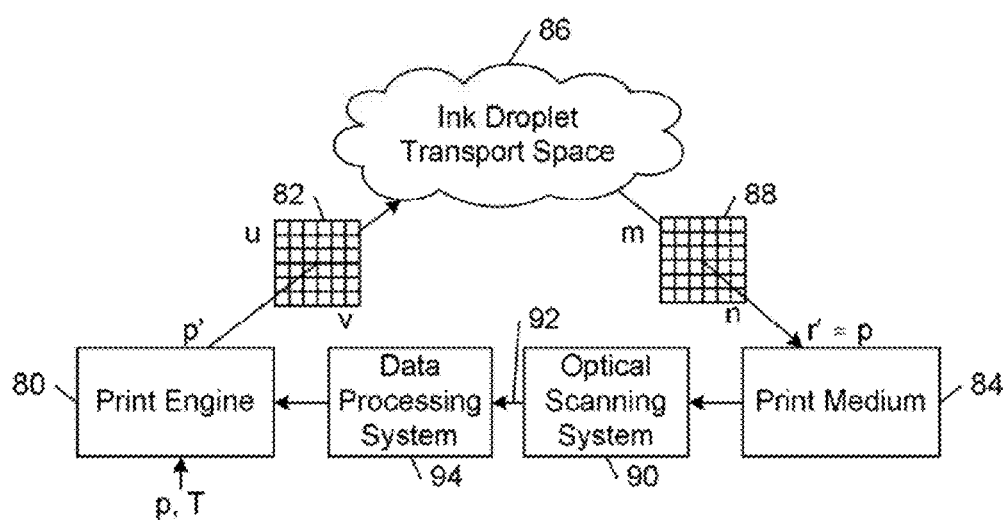
FIG. 8 is a block diagram of an embodiment of the image projection system of FIG. 1.

C. A Second Exemplary View Projection System Architecture and Application Environment FIG. 8 shows an embodiment 80 of the image projection system 10 that is implemented by print engine. The print engine 80 renders the modified version (p') of the desired projection image (p) by projecting an ink droplet pattern 82 corresponding to the modified version (p') of the desired projection image (p) from the first position, through an ink droplet transport space 86, and onto a print medium 84 (e.g., a sheet of paper) in the form of a rendered image 88. The rendered image 88 is passed to an optical scanning system 90. The optical scanning system 90 produces an electronic scanned version 92 of the rendered image 88 and passes the scanned image 92 to a data processing system 94. In some embodiments, the data processing system determines the primary transport matrix (T), the first and second derived transport matrices (D1, D2), the approximate inverse ($\tilde{D}1^T$) of the first derived transport matrix (D1), and the modified version (p') of the desired projection image (p) from the scanned image 92 in accordance with the methods described above.

The print engine 80 may be implemented by any of a wide variety of different commercially available ink jet print engine and the optical scanning system 90 may be implemented by any of a wide variety of different commercially available optical scanner engines. The data processing system 94 may be implemented by any of the data processing system embodiments described above in connection with the data processing system 70.

V. CONCLUSION

The embodiments that are described herein provide improved view projection systems and methods that are capable of compensating for shape irregularities in the projection surfaces so as to reduce artifacts (e.g., geometrical distortions, defocus or color and intensity blending) in the projected images. In these embodiments, the compensation is achieved based on an improved approximation of the dual transport matrix that enables complex scattering effects to be compensated while still achieving realtime performance.

Other embodiments are within the scope of the claims.

The invention claimed is:

1. A method, comprising operating a physical processor to perform operations comprising:
   deriving a first derived matrix of transport coefficients and a second derived matrix of transport coefficients from a primary matrix of transport coefficients, wherein each of the transport coefficients describes transport of a respective image forming element from a first position onto one or more image forming elements at a second position;
   ascertaining an approximate inverse of the first derived matrix;
   determining a modified version of a projection image from the projection image, the approximated inverse of the first derived matrix, and the second derived matrix; and
   rendering the modified version of the projection image from the first position onto a physical medium at the second position,
   wherein the deriving comprises decomposing the primary matrix (T) into the first derived matrix (D1) and the second derived matrix (D2) such that T=D1+D2.

2. The method of claim 1, wherein the ascertaining comprises:
   for each row of T, identifying one or more of the transport coefficients in the row of T that are higher in value than all other ones of the transport coefficients in the row of T;
   respectively deriving one or more corresponding ones of the transport coefficients in D1 from the one or more identified transport coefficients and setting equal to zero all other ones of the transport coefficients in D1; and
   respectively setting equal to zero ones of the transport coefficients in D2 that correspond to the identified transport coefficients in T and setting all other ones of the transport coefficients in D2 respectively equal to the corresponding ones of the transport coefficients in T.

3. The method of claim 2, wherein:
   for each row of T, the identifying comprises identifying only the highest valued one of transport coefficients in the row of T;
   the deriving comprises setting the corresponding transport coefficients in D1 equal to the identified transport coefficients in T and setting equal to zero all other ones of the transport coefficients in D1; and
   the setting comprises setting equal to zero only the transport coefficients in D2 that correspond to the identified transport coefficients in T and setting all other ones of the transport coefficients in D2 respectively equal to the corresponding ones of the transport coefficients in T.

4. The method of claim 3, wherein the ascertaining comprises setting each column ($A_i$) of a matrix A equal to a normalized version of the corresponding column ($D1_i$) of D1 in accordance with $$\tilde{A}_i = \frac{D1_i}{\|D1_i\|^2},$$

wherein i has a value that indexes the columns $D1_i$ and $\tilde{A}_i$, $\|D1_i\|$ is a norm of $D1_i$, and the approximate inverse ($\tilde{D}1^T$) of D1 is given by a transpose ($A^T$) of the matrix A.

5. The method of claim 4, wherein the determining comprises determining the modified version (p') of the projection image (p) by solving for p' in $$p' = \tilde{D}1^T \cdot (p - D2 \cdot p')$$

wherein D2 is the second derived matrix.

6. The method of claim 5, wherein the solving comprises iteratively solving a series of approximations ($p'_j$) of the corrected version (p') of the projection image (p) in accordance with $$p'_{j+1} = \tilde{D}1^T \cdot (p - D2 \cdot p'_j),$$

j has a value that indexes the approximations ($p'_j$) in the series, and $p'_0 = \tilde{D}1^T \cdot p$.

7. A method, comprising operating a physical processor to perform operations comprising:
   deriving a first derived matrix of transport coefficients and a second derived matrix of transport coefficients from a primary matrix of transport coefficients, wherein each of the transport coefficients describes transport of a respective image forming element from a first position onto one or more image forming elements at a second position;
   ascertaining an approximate inverse of the first derived matrix;
   determining a modified version of a projection image from the projection image, the approximated inverse of the first derived matrix, and the second derived matrix; and
   rendering the modified version of the projection image from the first position onto a physical medium at the second position,
   wherein the determining comprises determining the modified version (p') of the projection image (p) by solving for p' in $$p' = \tilde{D}1^T \cdot (p - D2 \cdot p')$$

wherein $\tilde{D}1^T$ is the approximate inverse of the first derived matrix (D1), and D2 is the second derived matrix.

8. The method of claim 7, wherein the solving comprises iteratively solving a series of approximations ($p'_i$) of the modified version (p') of the projection image (p) in accordance with $$p'_{i+1} = \tilde{D}1^T \cdot (p - D2 \cdot p'_i),$$

and i has a value that indexes the approximations ($p'_i$) in the series.

9. The method of claim 8, wherein $p'_0 = \tilde{D}1^T \cdot p$.

10. The method of claim 1, wherein the rendering comprises projecting a light pattern corresponding to the modified version of the projection image from a projector apparatus at the first position onto a physical surface at the second position.

11. The method of claim 1, wherein the rendering comprises projecting an ink droplet pattern corresponding to the modified version of the projection image from a print engine at the first position onto a physical print medium at the second position.

12. At least one non-transitory computer-readable medium having computer-readable program code embodied therein, the computer-readable program code adapted to be executed by a computer to implement a method comprising:
deriving a first derived matrix of transport coefficients and a second derived matrix of transport coefficients from a primary matrix of transport coefficients, wherein each of the transport coefficients describes transport of a respective image forming element from a first position onto one or more image forming elements at a second position;
ascertaining an approximate inverse of the first derived matrix;
determining a modified version of a projection image from the projection image, the approximated inverse of the first derived matrix, and the second derived matrix; and
rendering the modified version of the projection image from the first position onto a physical medium at the second position,
wherein the deriving comprises decomposing the primary matrix (T) into the first derived matrix (D1) and the second derived matrix (D2) such that T=D1+D2.

13. The at least one non-transitory computer-readable medium of claim 12, wherein the method comprises:
for each row of T, identifying only the highest valued one of transport coefficients in the row of T;
setting the corresponding transport coefficients in D1 equal to the identified transport coefficients in T and setting equal to zero all other ones of the transport coefficients in D1; and
setting equal to zero only the transport coefficients in D2 that correspond to the identified transport coefficients in T and setting all other ones of the transport coefficients in D2 respectively equal to the corresponding ones of the transport coefficients in T.

14. The at least one non-transitory computer-readable medium of claim 13, wherein the ascertaining comprises setting each column ($A_i$) of a matrix A equal to a normalized version of the corresponding column ($D1_i$) of D1 in accordance with $$A_i = \frac{D1_i}{\|D1_i\|^2},$$

wherein i has a value that indexes the columns $D1_i$ and $\tilde{A}_i$, $\|D1_i\|$ is a norm of $D1_i$, and the approximate inverse ($\tilde{D}1^T$) of D1 is given by a transpose ($A^T$) of the matrix A, and the determining comprises determining the modified version (p') of the projection image (p) by solving for p' in $$p' = \tilde{D}1^T \cdot (p - D2 \cdot p')$$

wherein D2 is the second derived matrix.

15. The at least one non-transitory computer-readable medium of claim 14, wherein the solving comprises iteratively solving a series of approximations ($p'_j$) of the corrected version (p') of the projection image (p) in accordance with $$p'_{j+1} = \tilde{D}1^T \cdot (p - D2 \cdot p'_j),$$

j has a value that indexes the approximations ($p'_j$) in the series, and $p'_0 = \tilde{D}1^T \cdot p$.

16. Apparatus, comprising:
a computer-readable medium storing computer-readable instructions; and
a data processing unit coupled to the computer-readable medium, operable to execute the instructions, and based at least in part on the execution of the instructions operable to perform operations comprising
deriving a first derived matrix of transport coefficients and a second derived matrix of transport coefficients from a primary matrix of transport coefficients, wherein each of the transport coefficients describes transport of a respective image forming element from a first position onto one or more image forming elements at a second position,
ascertaining an approximate inverse of the first derived matrix,
determining a modified version of a projection image from the projection image, the approximated inverse of the first derived matrix, and the second derived matrix, and
rendering the modified version of the projection image from the first position onto a physical medium at the second position,
wherein the deriving comprises decomposing the primary matrix (T) into the first derived matrix (D1) and the second derived matrix (D2) such that T=D1+D2.

17. The apparatus of claim 16, wherein:
for each row of T, identifying only the highest valued one of transport coefficients in the row of T;
setting the corresponding transport coefficients in D1 equal to the identified transport coefficients in T and setting equal to zero all other ones of the transport coefficients in D1; and
setting equal to zero only the transport coefficients in D2 that correspond to the identified transport coefficients in T and setting all other ones of the transport coefficients in D2 respectively equal to the corresponding ones of the transport coefficients in T.

18. The apparatus of claim 17, wherein the ascertaining comprises setting each column ($A_i$) of a matrix A equal to a normalized version of the corresponding column ($D1_i$) of D1 in accordance with $$A_i = \frac{D1_i}{\|D1_i\|^2},$$

wherein i has a value that indexes the columns $D1_i$ and $\tilde{A}_i$, $\|D1_i\|$ is a norm of $D1_i$, and the approximate inverse ($\tilde{D}1^T$) of D1 is given by a transpose ($A^T$) of the matrix A, and the determining comprises determining the modified version (p') of the projection image (p) by solving for p' in $$p' = \tilde{D}1^T \cdot (p - D2 \cdot p')$$

wherein D2 is the second derived matrix.

19. The apparatus of claim 18, wherein the solving comprises iteratively solving a series of approximations ($p'_j$) of the corrected version (p') of the projection image (p) in accordance with $$p'_{j+1} = \tilde{D}1^T \cdot (p - D2 \cdot p'_j),$$

j has a value that indexes the approximations ($p'_j$) in the series, and $p'_0 = \tilde{D}1^T \cdot p$.

20. The method of claim 1, wherein each of the transport coefficients describes transport of a respective image forming element of a projection image from the first position onto one or more image forming elements of a rendered image at the second position.

* * * * *